(12) United States Patent
Schwarz et al.

(10) Patent No.: US 8,055,846 B2
(45) Date of Patent: Nov. 8, 2011

(54) DATA VAULTING IN EMERGENCY SHUTDOWN

(75) Inventors: Shemer Schwarz, Tel-Aviv (IL); Efraim Zeidner, Haifa (IL); Ehood Garmiza, Neve Ziv (IL)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 12/192,228

(22) Filed: Aug. 15, 2008

(65) Prior Publication Data

US 2010/0042783 A1 Feb. 18, 2010

(51) Int. Cl.
*G06F 12/00* (2006.01)

(52) U.S. Cl. ......... 711/118; 711/154; 711/156; 714/6.1; 714/6.23; 714/6.3

(58) Field of Classification Search ................... 711/118, 711/154, 156; 714/6.1, 6.23, 6.3
See application file for complete search history.

(56) References Cited

U.S. PATENT DOCUMENTS

| | | | |
|---|---|---|---|
| 5,448,719 A * | 9/1995 | Schultz et al. | 714/5.11 |
| 5,524,203 A * | 6/1996 | Abe | 714/6.1 |
| 5,636,359 A * | 6/1997 | Beardsley et al. | 711/122 |
| 5,724,501 A | 3/1998 | Dewey et al. | |
| 5,724,542 A * | 3/1998 | Taroda et al. | 711/113 |
| 5,748,874 A * | 5/1998 | Hicksted et al. | 714/24 |
| 6,438,661 B1 | 8/2002 | Beardsley et al. | |
| 6,928,521 B1 | 8/2005 | Burton et al. | |
| 7,395,452 B2 * | 7/2008 | Nicholson et al. | 714/22 |
| 2002/0138695 A1 | 9/2002 | Beardsley et al. | |
| 2003/0229651 A1 | 12/2003 | Mizuno et al. | |
| 2004/0078666 A1 | 4/2004 | Aasheim et al. | |
| 2004/0255181 A1 | 12/2004 | Hsu et al. | |
| 2005/0080762 A1 | 4/2005 | Nakashima et al. | |
| 2005/0193242 A1 | 9/2005 | Ash et al. | |
| 2006/0069870 A1 * | 3/2006 | Nicholson et al. | 711/118 |

FOREIGN PATENT DOCUMENTS

WO WO-2007047438 4/2007

* cited by examiner

*Primary Examiner* — Stephen Elmore
(74) *Attorney, Agent, or Firm* — Griffiths & Seaton PLLC

(57) ABSTRACT

A method for data storage includes accepting write commands belonging to a storage operation invoked by a host computer, and caching the write commands in a volatile memory that is powered by external electrical power. A current execution status of the storage operation is also cached in the volatile memory. Responsively to an interruption of the external electrical power during the storage operation, the cached write commands and the cached execution status are backed up in a non-volatile memory. Upon resumption of the external electrical power, the backed up execution status is recovered, so as to resume the interrupted storage operation.

25 Claims, 3 Drawing Sheets

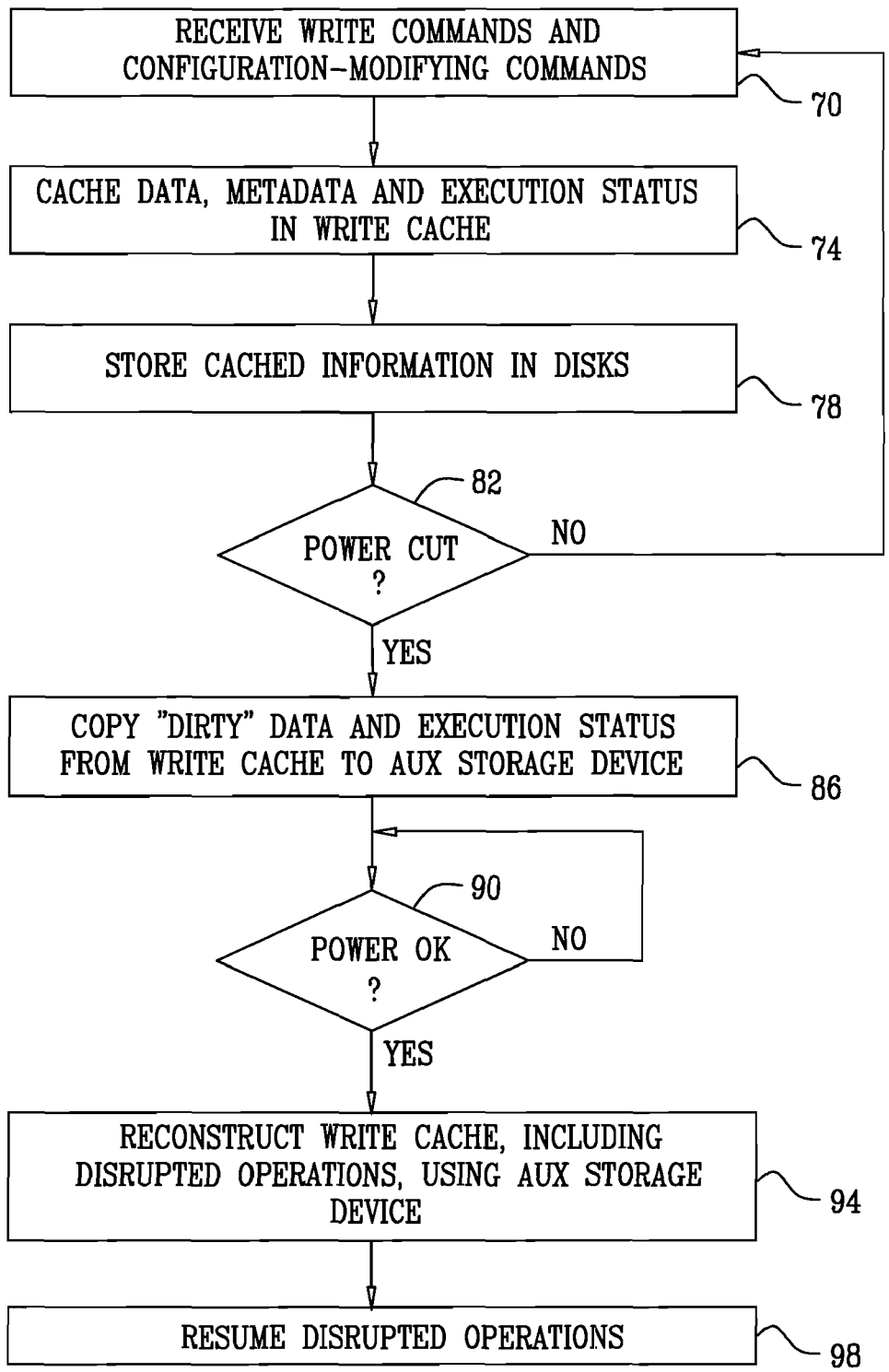

DATA VAULTING IN EMERGENCY SHUTDOWN

BACKGROUND

The present invention relates generally to data storage, and particularly to methods and systems for protecting cached data against loss of electrical power.

Various methods and systems for data storage are known in the art. A typical storage application accepts Input/Output (I/O) commands (e.g., read and write commands) from a host, and executes the commands vis-à-vis a storage device, such as a disk. Some data storage systems employ caching techniques, which cache read and/or write commands in volatile memory before committing them to disk. Caching techniques generally improve the I/O access time of the system and the efficiency of the storage process.

BRIEF SUMMARY

Embodiments of the present invention provide a method for data storage. The method includes accepting write commands belonging to a storage operation invoked by a host computer, and caching the write commands in a volatile memory that is powered by external electrical power. A current execution status of the storage operation is also cached in the volatile memory.

Responsively to an interruption of the external electrical power during the storage operation, the cached write commands and the cached execution status are backed-up in a non-volatile memory. Upon resumption of the external electrical power, the backed-up execution status is recovered, so as to resume the interrupted storage operation.

In some embodiments, the execution status includes an operation journal. Additionally or alternatively, the execution status may include state information of the storage operation. In a disclosed embodiment, the write commands specify data that are sent by the host computer for storage in one or more storage devices, and the storage operation manipulates a logical volume allocated in the one or more storage devices. In some embodiments, the storage operation creates the logical volume, deletes the logical volume, creates a snapshot of the logical volume at a given point in time and/or deletes a previously-created snapshot of the logical volume.

In another embodiment, the write commands specify data items that are sent by the host computer for storage in one or more storage devices, and backing-up the cached write commands includes backing-up only a subset of the cached write commands, which specify first instances of the data items that are more recent than corresponding second instances of the respective data items that are stored in the storage devices. In yet another embodiment, accepting the write commands includes communicating with the host computer over a Storage Area Network (SAN).

In still another embodiment, the non-volatile memory includes a storage device powered by a temporary power source. The storage device may include at least one component selected from a group of components consisting of a disk and a Random Access Memory (RAM) device. In some embodiments, the non-volatile memory includes a Flash memory device. In an embodiment, the write commands specify data sent by the host computer for storage in one or more storage devices, and the non-volatile memory includes a memory space that is allocated in the one or more storage devices.

Apparatus and computer software product for data storage are also described.

The present invention will be more fully understood from the following detailed description of the embodiments thereof, taken together with the drawings in which:

BRIEF DESCRIPTION OF THE SEVERAL VIEWS OF THE DRAWINGS

FIG. 3 is a flow chart that schematically illustrates a method for protecting cached data, in accordance with an embodiment of the present invention.

DETAILED DESCRIPTION

Overview

In some known data storage systems, a storage controller receives write commands from one or more hosts with data for storage in one or more storage devices, e.g., disks. The storage controller initially caches the write commands in a volatile write cache, before the commands are performed on the disks. During normal operation, the storage controller is powered from an external power supply. Since the write cache comprises volatile memory, it is vulnerable to power loss events.

In order to protect against such events, some known storage configurations use an auxiliary storage device that is powered by a temporary power source, such as a battery. When external power is unavailable, the storage controller immediately backs-up at least some of the contents of the write cache to the auxiliary storage device. During the back-up operation, electrical power to the write cache and auxiliary storage device is provided by the temporary power source. When external power is reapplied, the storage controller recovers the contents of the write cache from the auxiliary storage device. This technique is sometimes referred to as a "fire hose dump."

The mere backing-up of write commands, however, is not sufficient for providing seamless recovery of the system following a power loss event. In a typical system, the hosts carry out storage operations, such as "create volume" or "delete volume" operations, which modify the organization, layout or storage configuration of the stored data in the storage devices. When recovering from power loss, such storage operations often have to be canceled, rolled back or restarted, even when the write commands belonging to these operations were fully backed-up and recovered.

Embodiments of the present invention provide improved methods and systems for protecting against power loss events in data storage applications. In some embodiments that are described hereinbelow, the storage controller caches, in addition to the write commands, the execution status of storage operations that are currently in progress. When backing-up the contents of the write cache to the auxiliary storage device, the storage controller backs-up the current execution status, as well. When external power is reapplied, the storage controller recovers the backed-up information, including the execution status of the different storage operations.

Thus, when using the methods and systems described herein, the storage controller can resume the storage operations performed by the hosts from the point at which they were disrupted using the recovered execution status, without having to roll-back or restart the operations. As a result, the recovery from power loss events is rapid and incurs only a minimum of additional I/O operations, in comparison with known methods.

System Description

Figure 1:
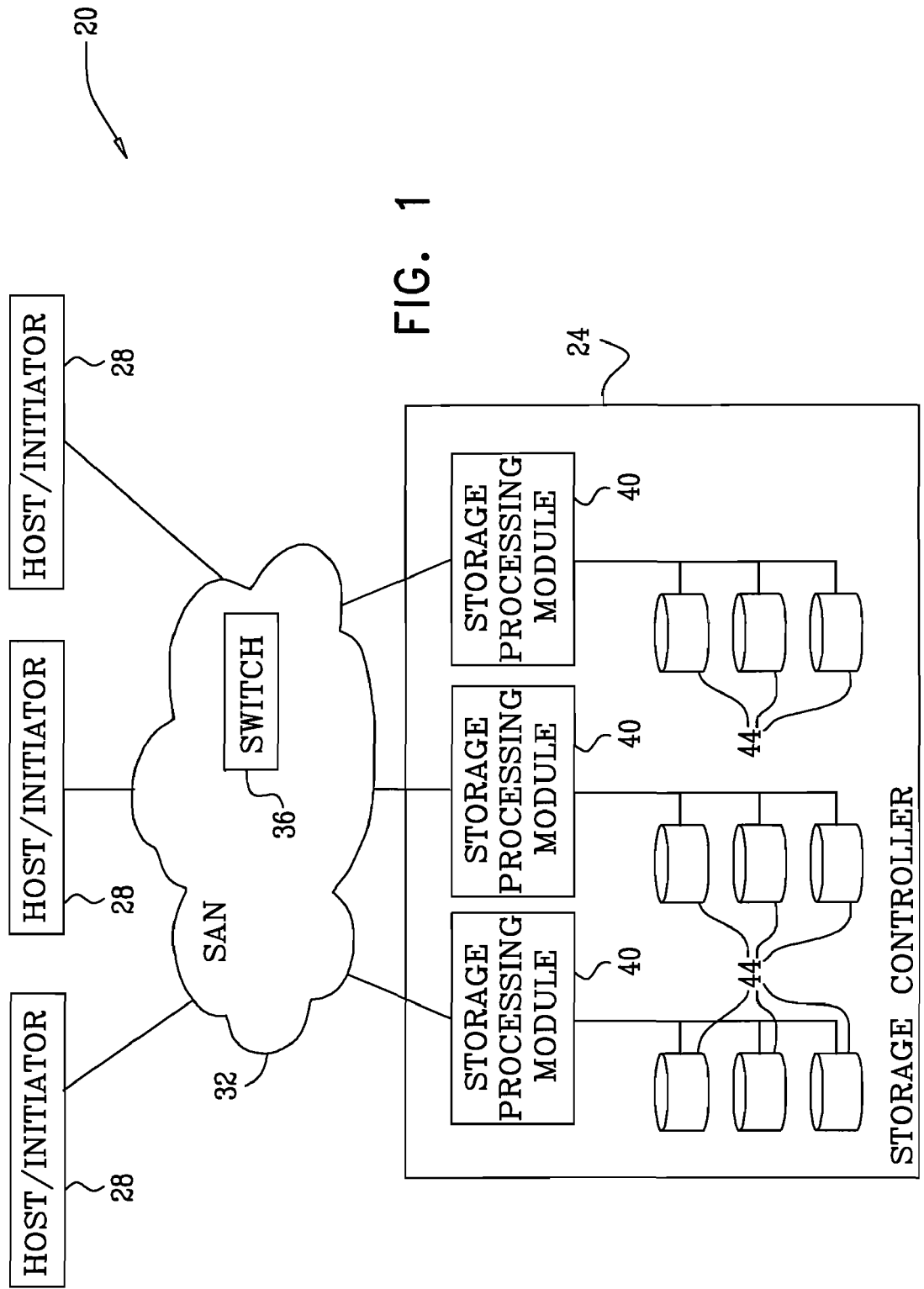
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a storage controller 24, which stores and retrieves data for hosts 28. The hosts are also referred to as initiators.

In the configuration of FIG. 1, the hosts are connected to the storage controller via a Storage Area Network (SAN), as is known in the art. The SAN typically comprises one or more network switches 36. The hosts and storage controller may communicate over SAN 32 using any suitable protocol, such as the Small Computer System Interface (SCSI) and/or Fibre-Channel (FC) protocols. Although the embodiment of FIG. 1 refers to a SAN configuration, the hosts and storage controller may be connected using any other suitable configuration, such as a Network-Attached Storage (NAS) or Direct-Attached Storage (DAS) configuration.

Storage controller 24 comprises multiple storage processing modules 40, which store data in multiple storage devices, such as disks 44. Storage controller 24 may comprise any desired number of modules 40 and any desired number of disks 44. In a typical configuration, the storage controller may comprise between 1-32 storage processing modules and between 2-2000 disks, although any other suitable numbers can also be used. In the exemplary configuration of FIG. 1, each module 40 stores data in a separate set of disks 44. In alternative embodiments, however, a given disk 44 need not be uniquely associated with a particular module 40. For example, a pool of disks 44 may be common to all modules 40.

Figure 2:
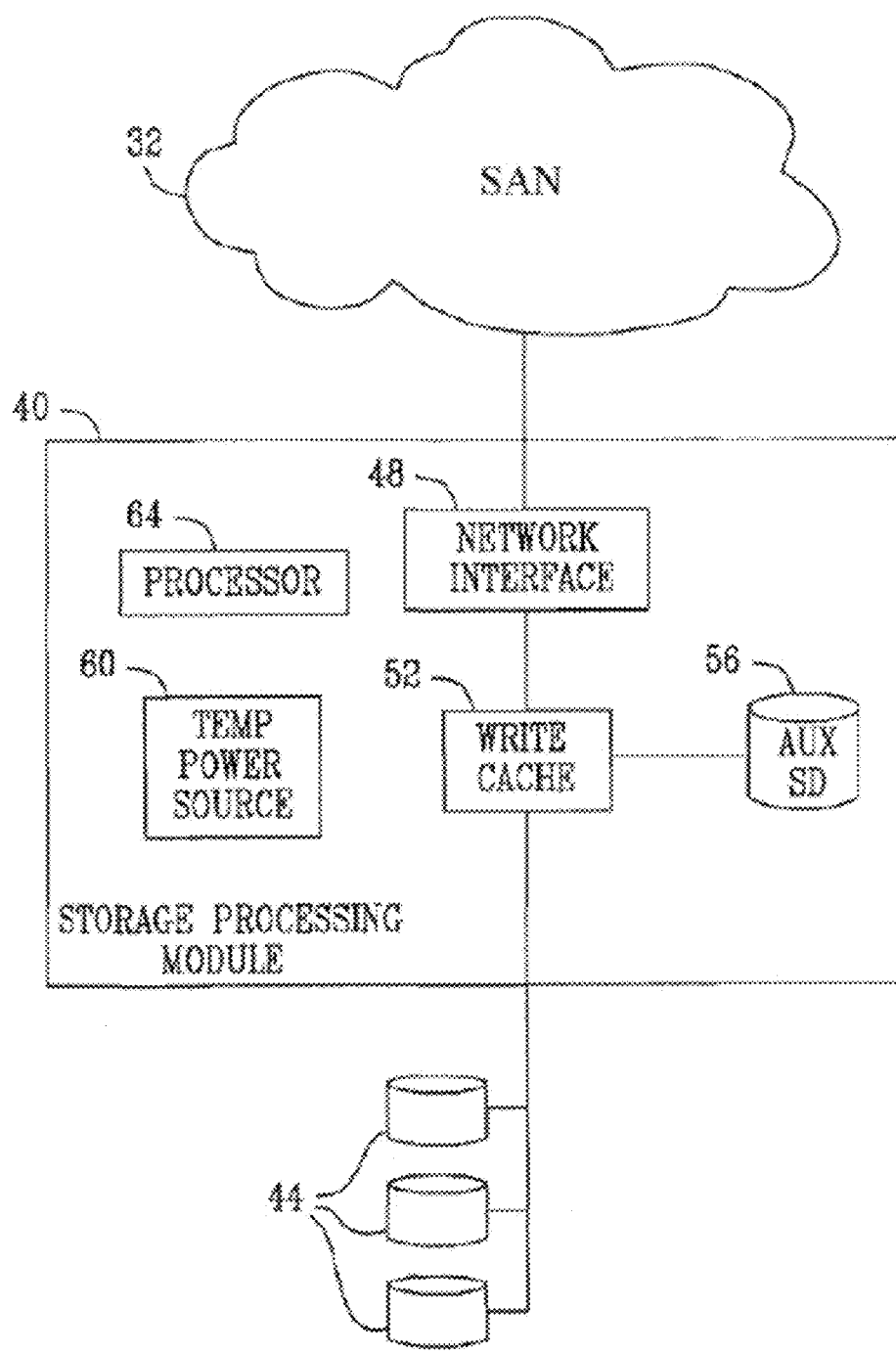
FIG. 2 is a block diagram that schematically illustrates a storage processing module, in accordance with an embodiment of the present invention.

FIG. 2 is a block diagram that schematically illustrates storage processing module 40, in accordance with an embodiment of the present invention. Module 40 comprises a network interface 48, which communicates with SAN 32. In particular, the network interface accepts I/O commands (e.g., read and write commands) from hosts 28 and forwards the commands to other elements of module 40.

Module 40 comprises a write cache 52, which caches some or all of the write commands accepted by the module before storing them to disks 44. Each write command comprises one or more memory pages containing data for storage. The terms "storing a write command" or "caching a write command" are used herein to refer to storage or caching of the data contained or indicated in the command, as well as to storage or caching of additional information or instructions conveyed by the command. Such additional information is referred to herein as metadata. While some metadata items may corresponds to a given page, other metadata items may not be page-specific, as will be explained in greater detail below.

Write cache 52 comprises a volatile memory, such as static or dynamic Random Access Memory (RAM). Caching of write commands is advantageous for several reasons. For example, the access time of cache 52 is usually much lower than the access time of disks 44. Thus, assuming module 40 acknowledges each write command as it is cached without waiting for the command to be stored in disks 44, the access time seen by hosts 28 is considerably reduced.

Moreover, module 40 may improve the efficiency of the storage process by accumulating multiple commands in cache 52 and only then storing the accumulated commands in disks 44. For example, module 40 may optimize the order in which the write commands are performed, e.g., in accordance with the target locations in the storage device, in order to reduce storage time. As another example, if a certain data item is addressed by several write commands, module 40 may carry only the write command corresponding to the most current version of the data item.

On the other hand, since write cache 52 comprises volatile memory, it is vulnerable to power loss events. The write cache, and possibly some other elements of module 40, operates on external electrical power that is supplied to the module. When this external power supply is unavailable, for any reason, the data cached in write cache 52 is lost.

Embodiments of the present invention provide improved methods and systems for protecting the content of the write cache against power interruption. The methods and systems described herein protect the cached information against any scenario in which external power is unavailable. Such scenarios may comprise, for example, power outages, equipment failures or even intentional power shutdown events.

In order to protect the content of the write cache, module 40 comprises an auxiliary Storage Device (SD) 56, a temporary power source 60 and a processor 64. When external power is unavailable, processor 64 backs-up some or all of the write commands that are cached in cache 52 to auxiliary SD 56. Temporary power source 60 provides electrical power to write cache 52, auxiliary SD 56 and processor 64 for a period of time that is sufficient for backing-up the write commands to the auxiliary SD. When external power is reapplied, processor 64 reconstructed the content of write cache 52 from the data backed-up in auxiliary SD 56. This process is sometimes referred to as a "fire hose dump" process.

In some embodiments, each cached page has a corresponding page descriptor, which holds metadata pertaining to the page. For example, the page descriptor may comprise a flag indicating whether the version of the page that is cached in cache 52 is more recent than the version that is stored in disks 44. A page whose cached version is more recent than its stored version is referred to as a "dirty" page. Typically, processor 64 backs-up only "dirty" pages to the auxiliary SD.

In a typical configuration, auxiliary SD 56 comprises a disk and power source 60 comprises a suitable battery. In some embodiments, the auxiliary SD comprises a disk that is separate from disks 44. In alternative embodiments, a certain storage space on disks 44 is allocated for use as the auxiliary SD. This storage space may comprise any suitable storage space on disks 44, e.g., an entire disk, several disks, or one or more fractions of one or more disks. Further alternatively, auxiliary SD 56 may comprise a non-volatile memory such as a Flash memory. In yet another embodiment, the auxiliary SD may comprise one or more RAM devices that are powered by temporary power source 60.

The energy capacity of power source 60, the storage size of auxiliary SD 56 and the storage size of write cache 52 are often interrelated. Typically, the auxiliary SD is dimensioned to have sufficient size for holding the "dirty" pages cached in write cache 52. Power source 60 is specified to have sufficient energy for powering the processor, the write cache and the auxiliary SD for the entire duration of the back-up process.

The configuration of module 40 shown in FIG. 2 is an exemplary configuration, which was chosen purely for the sake of conceptual clarity. Elements of module 40 that are not necessary for explaining the methods and systems described herein were omitted from the figure for clarity. For example, module 40 often comprises a read cache for caching read commands, which is not shown in the figure. In alternative embodiments, module 40 may have any other suitable configuration.

Backing-Up the Status of Interrupted Storage Operations

In a typical application, hosts 28 carry out storage operations comprising I/O (read and write) commands. In other words, each write command can be viewed as a building block of a higher-level storage operation carried out by a host. The storage operations typically comprise operations that modify the organization, layout or storage configuration of the data that is stored in disks 44.

In many cases, a storage operation addresses or manipulates a specific logical volume allocated in storage controller 24. A logical volume, as is well-known in the art, comprises a virtual storage unit assigned in storage controller 24. Volumes are also referred to as Logical Units (LU) having Logical Unit Numbers (LUN). A storage operation carried out by a host may comprise, for example, a "create volume," "delete volume," "resize volume" or "format volume" operation, each of which can be represented as a sequence of read and/or write operations.

Another class of storage operations addresses the manipulation of snapshots. A snapshot is a copy of a given volume, which is created at a certain point in time. Storage operations that manipulate snapshots may comprise, for example, "create snapshot" and "delete snapshot" operations. Yet another class of storage operations manipulates remote copies in mirroring applications, i.e., copies of logical volumes that are stored in a remote storage controller. Operations in this class may comprise, for example, "create remote copy" and "delete remote copy" operations. Further alternatively, hosts 28 may carry out any other suitable storage operation that modifies the layout, organization or configuration of the stored data and can be represented by a sequence of read and write commands.

Some storage operations may comprise lower-level steps, such as updating hierarchical data structures used for representing logical volumes and snapshots, updating an operation journal that logs the operation progress, updating a bitmap of physical partitions in disks 44, transferring of in-progress transactions to a remote mirror, and/or organization of free storage space ("garbage collection").

As can be appreciated, when one or more write commands belonging to a certain storage operation are cached in cache 52, unavailability of external power in module 40 may disrupt the entire storage operation. When external power is resumed, the storage operation may need to be canceled, rolled-back or restarted.

Embodiments of the present invention provide improved methods and systems for protecting against disruption of storage operations caused by loss of external power. In addition to caching data and metadata, the methods and systems described herein cache in write cache 52 the current execution status of the storage operations that are currently in progress. The current execution status may comprise an operation journal and/or state information regarding storage operations that are in progress. In response to detecting that external power is unavailable, processor 64 backs-up the specification of the current execution status in auxiliary SD 56.

For a given storage operation, the metadata and execution status backed-up in the auxiliary SD are sufficient for resuming the storage operation from the point it was disrupted. When external power is reapplied, processor 64 recovers the backed-up metadata and execution status, and uses this information to resume the storage operation from the point it was disrupted by the power loss event. Thus, when using this technique, recovery from power loss events is relatively quick and incurs only a minimum of extra I/O commands.

The execution status may comprise any suitable parameters regarding the storage operations and/or their execution state. For example, the metadata may record the type of storage operation that is carried out, the parameters provided as input to the operation (e.g., an identifier of a logical volume that is to be modified by the operation and/or a new desired size for the logical volume), the execution stage that the operation has reached (in other words, what metadata has started changing). In some embodiments, the execution status comprises an operation journal, which records which operations were received for execution, the parameters provided as input to the operations, and the last state the operations were in. This sort of information enables the storage controller to seamlessly resume any interrupted operations when external power is reapplied.

Data Vaulting Method Description

FIG. 3 is a flow chart that schematically illustrates a method for protecting cached data, in accordance with an embodiment of the present invention. The method begins with module 40 of storage controller 24 receiving write commands from one or more hosts 28, at a command acceptance step 70. Each write command belongs to a certain storage operation that is invoked by a certain host. As explained above, the storage operations modify the layout or organization of the stored data. Thus, step 70 can be viewed as a step of receiving both commands for writing data and commands that modify the data configuration.

Processor 64 of module 40 caches the write commands, as well as applicable metadata and execution status, in write cache 52, at a caching step 74. In particular, processor 64 caches the current execution status of the storage operations that are currently in progress. At a later point in time, processor 64 transfers the cached write commands for storage in disks 44.

Processor 64 checks whether external power is available, at a power loss checking step 82. In some embodiments, module 40 receives an alarm signal (e.g., from an external Uninterruptible Power Supply—UPS) indicating external power loss and an approaching shutdown. In the Advanced Interactive executive (AIX) operating system, this signal is denoted Early Power Off Warning (EPOW). Unix-based systems may use a configuration file called psmon.conf for monitoring power supply status. Alternatively, processor 64 may use any other suitable signal or indication to check the status of the external power supply.

If external power is available, the method loops back to step 70 above, and module 40 continues to receive, cache and store write commands. If processor 64 detects that external power is unavailable, the processor immediately backs-up the "dirty" pages from write cache 52 to auxiliary SD 56, at a fire hosing step 86. In addition to the "dirty" pages, processor 64 also copies the metadata and the current execution status of the storage operations that are currently in progress. In some embodiments, the backed-up execution status comprises an operation journal and operation-state data, which records the current state of each storage operation. When backing-up the data, metadata and execution status to the auxiliary SD, electrical power to the processor, auxiliary SD and write cache is provided by temporary power source 60.

Processor 64 checks whether external power is reapplied, at a power status checking step 90. Upon detecting that power is reapplied, the processor recovers the data, metadata and execution status that is backed-up in auxiliary SD 94 to the write cache, at a recovery step 94. In particular, the processor recovers the backed-up execution status of the storage operations at the point in time in which external power was disrupted.

Using the recovered execution status, processor 64 resumes the execution of each disrupted storage operation from the state in which it was disrupted, at an operation resumption step 98.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

Although the embodiments described above mainly address back-up and recovery in storage controllers, the methods and systems described herein can also be used in other systems that cache write commands, such as in-memory database systems with Hard Disk Drives (HDD) having battery backup.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage by a processor device in a computing storage environment, comprising:
   accepting write commands belonging to a storage operation invoked by a host computer;
   caching the write commands in a volatile memory that is powered by external electrical power;
   caching in the volatile memory a current execution status of the storage operation;
   responsively to an interruption of the external electrical power during the storage operation, backing-up the cached write commands and the cached execution status in a non-volatile memory; and
   upon resumption of the external electrical power, recovering the backed-up execution status of the storage operation, so as to resume the interrupted storage operation based on the recovered execution status.

2. The method according to claim 1, wherein the execution status comprises an operation journal.

3. The method according to claim 1, wherein the execution status comprises state information of the storage operation.

4. The method according to claim 1, wherein the write commands specify data that are sent by the host computer for storage in one or more storage devices, and wherein the storage operation manipulates a logical volume allocated in the one or more storage devices.

5. The method according to claim 4, wherein the storage operation creates the logical volume.

6. The method according to claim 4, wherein the storage operation deletes the logical volume.

7. The method according to claim 4, wherein the storage operation creates a snapshot of the logical volume at a given point in time.

8. The method according to claim 4, wherein the storage operation deletes a previously-created snapshot of the logical volume.

9. The method according to claim 1, wherein the write commands specify data items that are sent by the host computer for storage in one or more storage devices, and wherein backing-up the cached write commands comprises backing-up only a subset of the cached write commands, which specify first instances of the data items that are more recent than corresponding second instances of the respective data items that are stored in the storage devices.

10. The method according to claim 1, wherein accepting the write commands comprises communicating with the host computer over a Storage Area Network (SAN).

11. The method according to claim 1, wherein the non-volatile memory comprises a storage device powered by a temporary power source.

12. The method according to claim 11, wherein the storage device comprises at least one component selected from a group of components consisting of a disk and a Random Access Memory (RAM) device.

13. The method according to claim 1, wherein the non-volatile memory comprises a Flash memory device.

14. The method according to claim 1, wherein the write commands specify data sent by the host computer for storage in one or more storage devices, and wherein the non-volatile memory comprises a memory space that is allocated in the one or more storage devices.

15. Apparatus for data storage, comprising:
   an interface, which is operative to accept write commands belonging to a storage operation invoked by a host computer;
   a volatile cache memory, which is powered by external electrical power and is coupled to cache the write commands and to cache a current execution status of the storage operation;
   an auxiliary non-volatile memory; and
   a processor, which is coupled, responsively to an interruption of the external electrical power during the storage operation, to back-up the cached write commands and the cached execution status in the auxiliary non-volatile memory and, upon resumption of the external electrical power, to recover the backed-up execution status of the storage operation, so as to resume the interrupted storage operation based on the recovered execution status.

16. The apparatus according to claim 15, wherein the write commands specify data that are sent by the host computer for storage in one or more storage devices, and wherein the storage operation manipulates a logical volume allocated in the one or more storage devices.

17. The apparatus according to claim 16, wherein the storage operation creates the logical volume.

18. The apparatus according to claim 16, wherein the storage operation deletes the logical volume.

19. The apparatus according to claim 16, wherein the storage operation creates a snapshot of the logical volume at a given point in time.

20. The apparatus according to claim 16, wherein the storage operation deletes a previously-created snapshot of the logical volume.

21. The apparatus according to claim 15, wherein the interface is operative to communicate with the host computer over a Storage Area Network (SAN).

22. The apparatus according to claim 15, wherein the auxiliary non-volatile memory comprises a storage device, and wherein the apparatus comprises a temporary power source, which is operative to provide electrical power for operating the storage device.

23. The apparatus according to claim 15, wherein the auxiliary non-volatile memory comprises a Flash memory device.

24. The apparatus according to claim 15, wherein the write commands specify data sent by the host computer for storage in one or more storage devices, and wherein the auxiliary non-volatile memory comprises a memory space that is allocated in the one or more storage devices.

25. A computer software product for data storage, the product comprising a non-transitory computer-readable medium, in which program instructions are stored, which instructions, when read by the computer, cause the computer to accept write commands belonging to a storage operation invoked by a host computer, to cache the write commands in a volatile cache memory, which is powered by external electrical power, to cache in the volatile cache memory a current execution status of the storage operation, to back-up the cached write commands and the cached execution status in an auxiliary non-volatile memory responsively to an interruption of the external electrical power during the storage operation, and, upon resumption of the external electrical power, to recover the backed-up execution status of the storage operation, so as to resume the interrupted storage operation based on the recovered execution status.

* * * * *